United States Patent [19]

Tominaga

[11] Patent Number: 5,361,246

[45] Date of Patent: Nov. 1, 1994

[54] OPTICAL INFORMATION PROCESSING APPARATUS PROVIDED WITH MEANS FOR DETECTING ABNORMALITY OF FOCUSING SERVO WITH A PREDETERMINED SENSITIVITY

[75] Inventor: Hidekazu Tominaga, Kawasaki, Japan

[73] Assignee: Canon Kabushiki Kaisha, Tokyo, Japan

[21] Appl. No.: 178,434

[22] Filed: Jan. 6, 1994

Related U.S. Application Data

[63] Continuation of Ser. No. 330,265, Mar. 29, 1989, abandoned.

[30] Foreign Application Priority Data

Mar. 31, 1988 [JP] Japan ................................ 63-076393

[51] Int. Cl.$^5$ ............................................. G11B 7/00
[52] U.S. Cl. ................................ 369/44.32; 369/44.25
[58] Field of Search ...................... 369/116, 44.25, 100, 369/53, 54, 32, 44.11, 44.29, 43, 44.38, 44.32, 44.37, 44.33; 250/201.5

[56] References Cited

U.S. PATENT DOCUMENTS

| | | | |
|---|---|---|---|
| 4,410,969 | 10/1983 | Maeda | 369/46 |
| 4,669,072 | 5/1987 | Miura et al. | 369/44.25 |
| 4,669,074 | 5/1987 | Hsieh et al. | 369/44.35 |
| 4,982,392 | 1/1991 | Soejima | 369/44.26 |
| 4,982,393 | 1/1991 | Matsushita et al. | 369/44.32 |
| 4,982,394 | 1/1991 | Kanda et al. | 369/44.32 |

FOREIGN PATENT DOCUMENTS 0089238  4/1987  Japan ................................ 369/44.32

*Primary Examiner*—Aristotelis Psitos
*Assistant Examiner*—Thang V. Tran
*Attorney, Agent, or Firm*—Fitzpatrick, Cella, Harper & Scinto

[57] ABSTRACT

An apparatus for effecting recording and/or reproduction of information by scanning an optical recording medium with a condensed light beam includes a detecting device for detecting a focusing error signal of the light beam, a focusing servo device for correcting a focusing state of the light beam on the basis of the focusing error signal, and a device for detecting abnormality of the focusing servo.

17 Claims, 6 Drawing Sheets

OPTICAL INFORMATION PROCESSING APPARATUS PROVIDED WITH MEANS FOR DETECTING ABNORMALITY OF FOCUSING SERVO WITH A PREDETERMINED SENSITIVITY

This application is a continuation of prior application, Ser. No. 07/330,265 filed Mar. 29, 1989, now abandoned.

BACKGROUND OF THE INVENTION

1. Field of the Invention

This invention relates to an optical information processing apparatus for effecting recording and/or reproduction of information by scanning an optical recording medium with a condensed light beam.

2. Related Background Art

Various forms, such as a disk-like form, a card-like form and a tape-like form are forms of media for recording information thereon by the use of light for and reading out the recorded information therefrom.

For example, in an optical disk, scanning is effected by a light beam modulated in accordance with information to be recorded and is reduced down into a minute spot, whereby information is recorded as optically detectable record pit rows (information tracks). In this case, to record information accurately without causing any difficulty such as intersection between the information tracks, it is necessary to control the applied position of the light spot in the surface of the optical disk in a direction perpendicular to the scanning direction (autotracking, hereinafter referred to as "AF"). Also, in order to apply the light spot as a minute spot of a stable size in spite of any bending or mechanical error of the optical disk, it is necessary to effect control in a direction perpendicular to the surface of the optical disk (auto focusing hereinafter referred to as "AF"). Also, during reproduction, the AT and the AF are necessary. There are various methods for such AT and AF techniques, but generally there is adopted a method whereby a differential between a plurality of light receiving surfaces of a photodetector for focusing and tracking which receive light reflected by or transmitted through a medium is taken to thereby obtain a focusing error signal and a tracking error signal, and an objective lens is driven by actuators for AT and AF.

Figure 1:
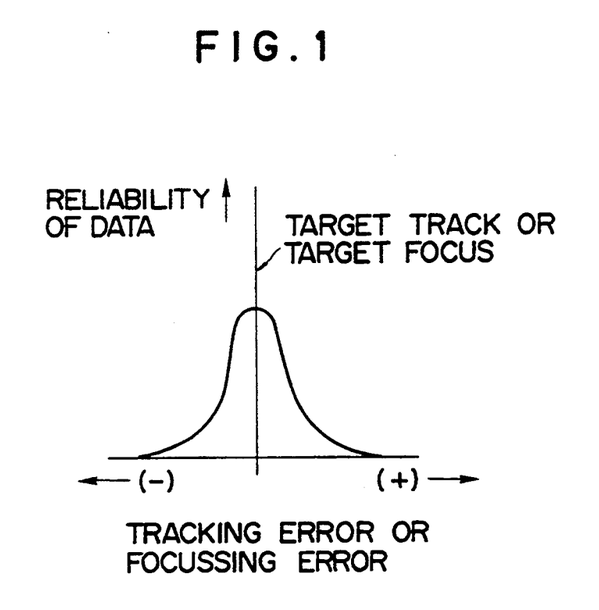
FIG. 1 is a graph showing the relation between a tracking error or a focusing error and the reliability of data.

FIG. 1 of the accompanying drawings shows the relation between a tracking error or a focusing error (the horizontal axis) and the reliability of the data of the then reproduced signal (the vertical axis). The time when the horizontal axis is 0 is the time when the light beam is on the target track or in the target focus state.

Now, during the recording and reproduction as described above, when there is a defect in the medium or when shock is applied from the outside, abnormality (i.e., the phenomenon that AT fails and the light beam does not correctly trace the information tracks) may arise in tracking servo. When such AT failure occurs, there has been the undesirable possibility that the objective lens moves randomly to thereby damage an optical head. Also, particularly when AT failure occurs during recording, there has been the problem that the light spot strays on the medium and superposed writing is effected on the recorded information with a result that the recorded information disappears.

Therefore, U.S. Pat. No. 4,669,072 proposes an optical information processing apparatus in which means for detecting the AT failure as described above is provided so that recording of information may De stopped when AT failure occurs. If such an apparatus is used, the problem attributable to the AT failure can be solved.

However, the trouble attributable to the abnormality of the servo has occurred not only in the aforedescribed AT, but also in AF. Particularly, if abnormality in focusing servo (i.e., the phenomenon that AF fails and the light beam becomes defocused on the medium) occurs during the recording of information, information which ought to be recorded is not actually recorded. If at this time, the information is not stored in a back-up memory or the like, this information will be lost permanently.

SUMMARY OF THE INVENTION

It is an object of the present invention to solve the above-noted problems peculiar to the prior art and to provide an optical information processing apparatus in which any trouble attributable to the abnormality of focusing servo does not occur.

The above object of the present invention is achieved by an apparatus for effecting recording and/or reproduction of information by scanning an optical recording medium with a condensed light beam. The apparatus includes:

means for detecting the focusing error signal of the light beam;

focusing servo means for correcting the focusing state of the light beam on the basis of the focusing error signal; and means for detecting the abnormality of said focusing servo.

DESCRIPTION OF THE PREFERRED EMBODIMENTS

Figure 2:
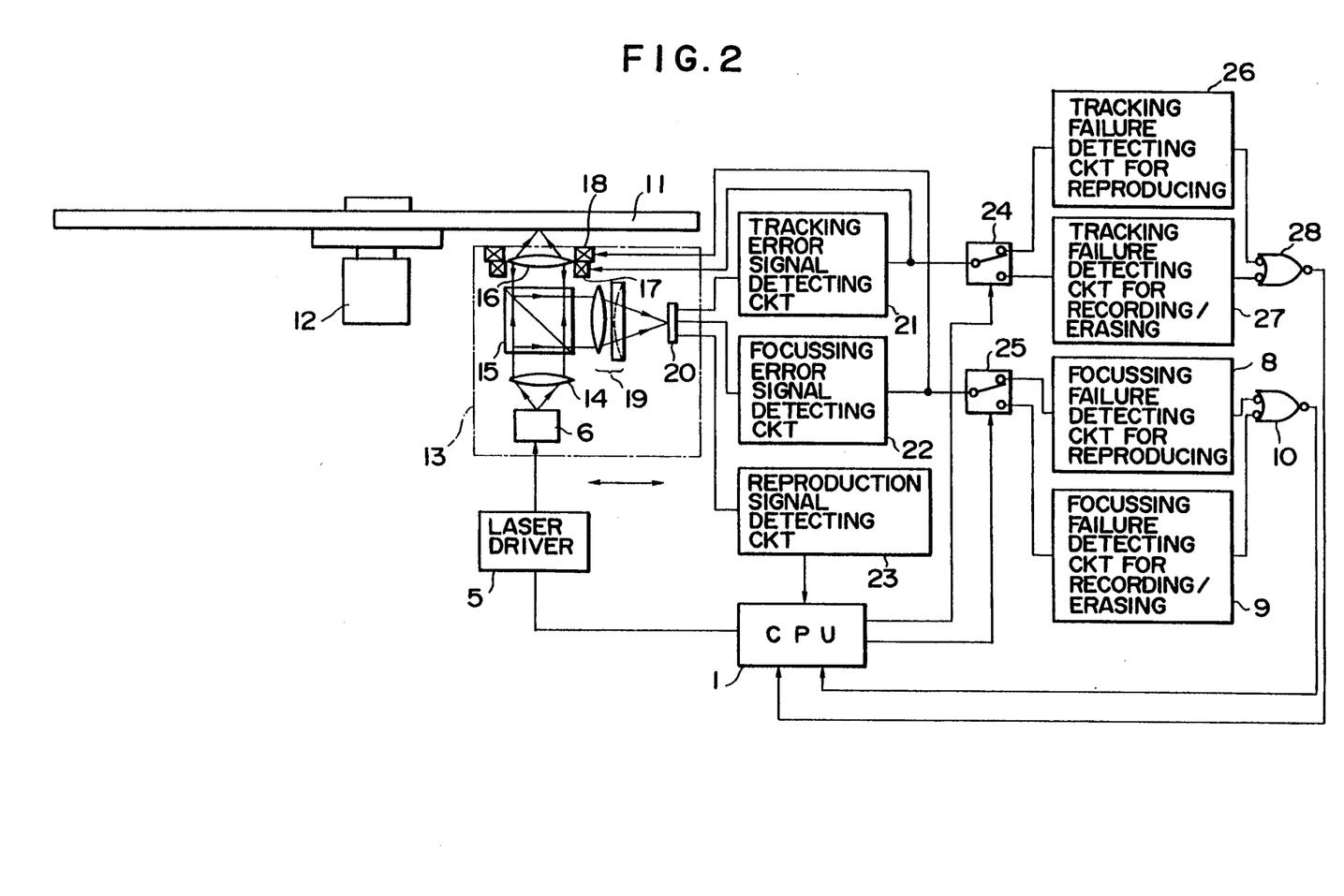
FIG. 2 is a schematic diagram showing an embodiment of the optical information processing apparatus of the present invention.

FIG. 2 is a schematic diagram showing an embodiment in which the present invention is applied to a magneto-optical disk apparatus. In FIG. 2, a magneto-optical disk 11 is comprised of a disk-like substrate formed of glass, plastics or the like, and a perpendicularly magnetized film provided on the substrate and usually having a thickness of 100–500Å. The perpendicularly magnetized film is formed of an amorphous alloy or the like and has a characteristic of being magnetized perpendicular to the surface of the film.

To record information on such a magneto-optical disk 11, a magnetic field in a perpendicular direction is first caused to act on the magneto-optical disk 11 and thereby arrange the direction of magnetization of the perpendicularly magnetized film in one direction in advance, and then a laser beam spot digitally modulated by an information signal is applied to the perpendicularly magnetized film to thereby render the temperature of the perpendicularly magnetized film in that region into the curie point or higher. Thereupon, in the portion to which the laser beam spot has been applied, the direction of magnetization is inverted by the influence of the surrounding magnetic field and a logic "1" (or "0") is recorded, whereby a record pit is formed. Thus, to render the temperature of the perpendicularly magnetized film into the curie point or higher when recording or erasing is effected, a laser power on the order of 10 mW, which is five to six times as great as the laser power during reproduction, is required.

Also, on a magneto-optical disk 11, there is a track guide groove formed in the shape of the volute, and a magneto-optical signal is recorded between this track guide groove and the adjacent track guide groove. Also, preformat pits such as a track address, a sector address and a sector mark detecting pattern are formed between the track guide groove and the adjacent track guide groove at a predetermined period. The addresses are read by the preformat pits, and data corresponding to the addresses are recorded, reproduced or erased in the circumferential direction by a magneto-optical signal.

In FIG. 2, the magneto-optical disk 11 is rotatively driven by a spindle motor 12. An optical head 13 for recording information on and reproducing information from the magneto-optical disk 11 is moved radially of the disk by drive means, not shown.

A laser diode 6 is provided in the optical head 13. A light beam emitted from the laser diode 6 passes through a collimator lens 14 and a beam splitter 15 and is condensed on the magneto-optical disk 11 by an objective lens 16. The light reflected by the magneto-optical disk 11 again passes through the objective lens 16 and is reflected by the beam splitter 5. This reflected light is condensed by a sensor lens 19 comprising a rotation-symmetrical lens and a cylindrical lens, and is received by a four-division detector 20.

The output of the four-division detector 20 is sent to a tracking error signal detecting circuit 21, a focusing error signal detecting circuit 22 and a reproduction signal detecting circuit 23, whereby a tracking error signal, a focusing error signal and a reproduction signal are detected. The principle of detection of these signals is described in detail in U.S. Pat. No. 4,410,969. The detected tracking error signal and focusing error signal are sent to a tracking actuator 17 and a focusing actuator 18, respectively. These actuators move the objective lens 16 in a tracking direction perpendicular to the optic axis and a focusing direction parallel to the optic axis in accordance with these signals, thereby accomplishing AT and AF control. Also, the reproduction signal is sent to a central processing unit (CPU) 1. The CPU 1 controls the light emission of the laser diode 6 through a laser driver 5.

On the other hand, a portion of the focusing error signal is sent to a switch 25. The switch 25 is changed over by a signal from the CPU 1, and causes the focusing error signal to be selectively input to a focusing failure detecting circuit 8 for reproducing during the reproduction of information and to a focusing failure detecting circuit 9 for recording/erasing during the recording or erasing of information. The focusing failure detection outputs detected by these circuits are sent to the CPU 1 through an OR gate 10. Likewise, a portion of the tracking error signal is selectively input to one of a tracking failure detecting circuit 26 for reproducing and a tracking failure detecting circuit 27 for recording/erasing through a switch 24. The tracking failure detection outputs of these circuits are sent to the CPU 1 through an OR gate 28. When such focusing failure detection outputs or such tracking failure detection outputs are input to the CPU 1, the CPU 1 sends a command for stopping of the recording, reproducing or erasing operation to various parts of the apparatus.

The focusing failure detecting circuit 9 for recording/erasing and the tracking failure detecting circuit 27 for recording/erasing are set to higher sensitivities than the focusing failure detecting circuit 8 for reproducing and the tracking failure detecting circuit 26 for reproducing. The reason is that between periods during recording/erasing and during reproduction, the amount of allowance for the focusing error and the tracking error differs. For example, during recording and during erasing, there is the possibility of recorded data being destroyed or disappearing and therefore, when focusing failure or tracking failure is likely to occur, the recording/erasing operation must be immediately stopped. By contrast, during reproduction, data can be read even if it deviates from the target track or the target focus position to some degree, and some positional deviation can be allowed. That is, even if data deviates within a range in which the servo system does not become unstable and within a range in which correction of the error of data is possible, it proves no hindrance to reproduction.

Therefore, in the present embodiment, by making the sensitivities of the focusing failure detecting means and the tracking failure detecting means higher during recording and erasing than during reproduction, the throughput of the apparatus can be prevented from being reduced by the operation being unreasonably stopped during reproduction.

Figure 3:
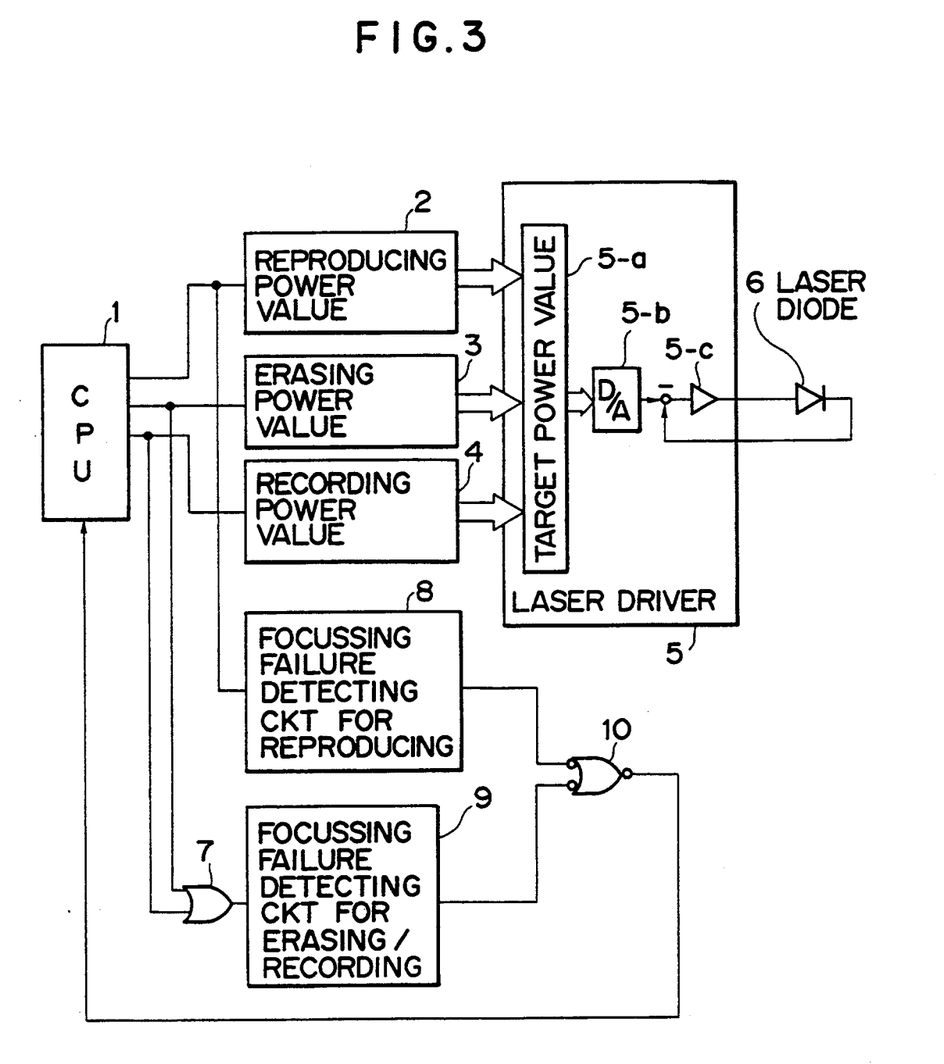
FIG. 3 is a block diagram showing focusing failure detecting means in the apparatus shown in FIG. 2.

FIG. 3 is a block diagram showing a specific example of the focusing failure detecting means in the apparatus shown in FIG. 2. In FIG. 3, members identical to those in FIG. 2 are given identical reference numerals.

In FIG. 3, the CPU 1 outputs a control signal for switching the laser power for recording, reproduction and erasing. The reproducing power value 2, the erasing power value 3 and the recording power value 4 each are comprised, for example, of an 8-bit launch circuit and a gate, and one of them is selected by the control signal from the CPU 1 and predetermined 8-bit data is sent to the target power value 5-a of the laser driver 5. A D/A converter 5-b converts the 8-bit digital data of the target power value 5-a into an analog value and determines the drive current of the laser diode 6. Reference character 5-c designates an auto power control (APC) circuit for monitoring the difference between the monitor of the drive current and the target current value and for always controlling a predetermined current. When, in this manner, selection of reproduction, erasing and recording is effected by the CPU 1, the laser diode 6 emits light with each preset power.

The focusing failure detecting circuit 8 for reproducing is selected by a reproducing power switching control signal being output from the CPU 1. The reference numeral 7 denotes an OR gate for selecting the next-stage focusing failure detecting circuit 9 for erasing-/recording when an erasing power switching control signal or a recording power switching control signal is output from the CPU 1. When a detection signal is produced from the focusing failure detecting circuit 8 for reproducing or the focusing failure detecting circuit 9 for erasing/recording, this signal is transmitted to the CPU 1 through the OR gate 10. The CPU 1 thus performs a predetermined processing operation.

A specific example of the construction of the focusing failure detecting circuits will now be described with reference to FIGS. 4, 5 and 6.

Figure 4:
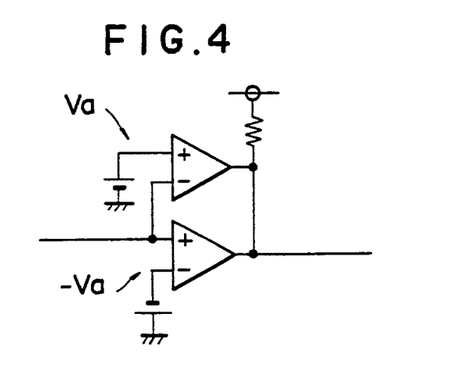
FIG. 4 shows an example of the construction of the focusing failure detecting circuit for reproducing shown in FIG. 3.
Figure 5:
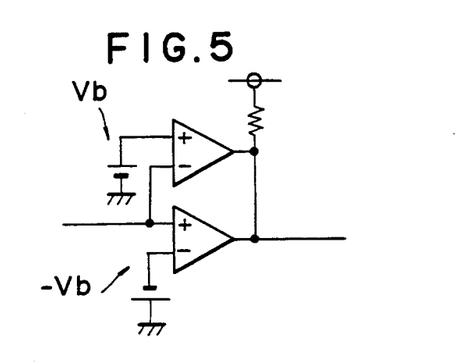
FIG. 5 shows an example of the construction of the focusing failure detecting circuit for erasing/recording shown in FIG. 3.

FIG. 4 shows the focusing failure detecting circuit for recording/erasing, and FIG. 5 shows the focusing failure detecting circuit for reproducing, and each of these circuits comprises a window comparator circuit comprising two comparators and a resistor. Reference voltages Va and Vb are determined by the relation between the focusing error signal and the focusing failure detection output as shown in FIG. 6. That is, $Va < Vb$.

Consequently, during recording and erasing, focusing failure is judged when the focusing error signal deviates from a zero deviation state (point A) to only Va, but, during reproduction, focusing failure does not yet occur. During reproduction, the focusing failure detection output is not transmitted to the CPU 1 until there is a deviation of Vb. During reproduction, the focusing failure detection level is extends from Va to Vb and thus, the frequency with which the operation is stopped by focusing failure becomes correspondingly smaller.

Figure 6:
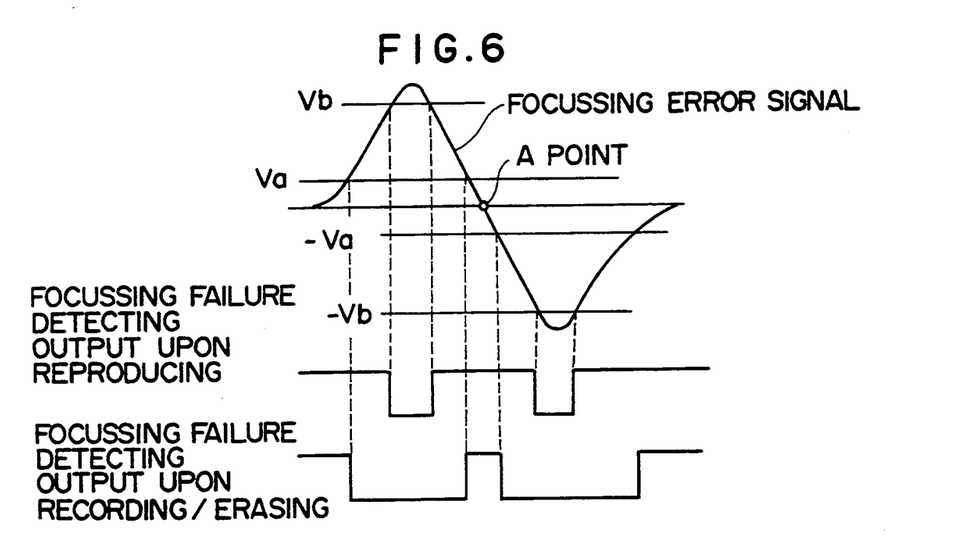
FIG. 6 shows the signal waveforms of various portions in the apparatus shown in FIG. 2.
Figure 7:
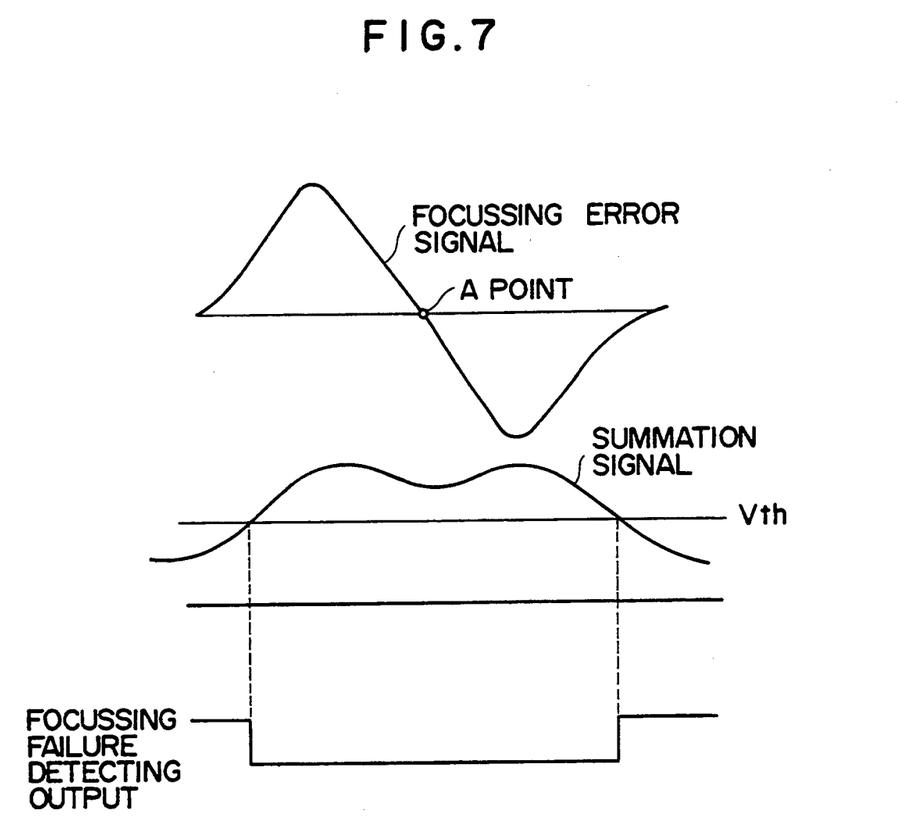
FIG. 7 shows the relation between the focusing error signal and the summation signal in a modification of the present invention.
Figure 8:
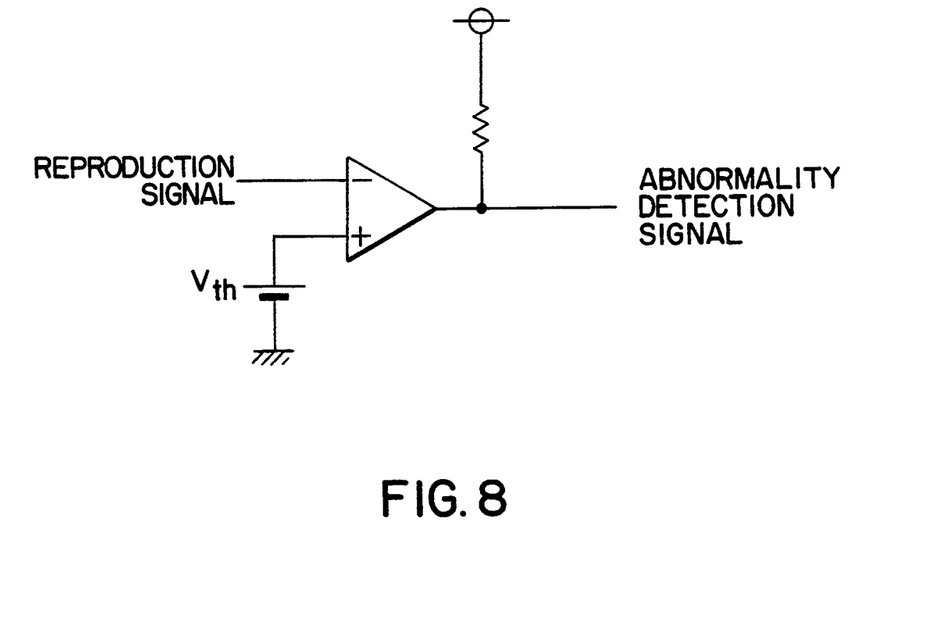
FIG. 8 shows an example of a comparing circuit for comparing a signal indicative of a measured light quantity with a reference signal.

In FIGS. 5 and 6, focusing failure is detected by comparing the focusing error signal with the reference voltage Vb, but, if during reproduction, the focusing failure detection may be more insensitive so that the servo may not deviate, it is also possible to detect focusing failure by the use of the reproduction signal shown in FIG. 2 (the summation signal of the servo signal). That is, as shown in FIG. 7, it is also possible to adopt an embodiment in which by the utilization of the fact that the summation signal indicative of the quantity of reflected light from the medium becomes greater near the in-focus state, a threshold level Vth is drawn in an S area in which focus servo can be effected and, when the summation signal becomes less than Vth, focus failure is judged. FIG. 8 shows an example of a comparing circuit for comparing the signal indicative of a measured light quantity (reproduction signal) with a reference signal $V_{th}$. An abnormality detection signal is output if the signal indicative of the light quantity becomes less than the reference value. By adopting such a system, the focusing failure detection level can be provided in a wider range, and it is possible to reduce the frequency of the detection.

Further, if as an extreme, the focusing failure detection is unnecessary during reproduction, the focusing failure detecting circuit 8 for reproducing may be eliminated in the construction shown in FIG. 2 so that only during recording and erasing, an error signal may be input from the switch 25 to the focusing failure detecting circuit 9.

In FIGS. 3 to 7, focusing failure detection has been described, and what has been described above also applies to tracking failure detection.

The present invention is not restricted to the above-described embodiment, but permits various other applications. For example, the shape of the optical recording medium is not restricted to the disk-like shape, but may be any shape such as a tape-like shade or a card-like shape. The present invention covers all such applications without departing from the scope thereof as defined in the appended claims.

What is claimed is:

1. An optical information processing apparatus comprising:
    recording-reproducing means for selectively effecting at least one of recording and reproducing of information by scanning an optical recording medium with a condensed light beam said recording-reproducing means comprising scanning means for scanning the recording medium with the light beam;
    focusing error detecting means for receiving light from the recording medium to detect a focusing error of the light beam, and for outputting a focusing error signal;
    focusing servo means for receiving the focusing error signal and for controlling said scanning means to correct a focusing state of the light beam on the basis of the focusing error signal;
    abnormality detection means for receiving from the recording medium to detect an abnormality of said focusing servo means by comparing the received light quantity with a reference value, said abnormality detection means having a predetermined detection sensitivity and producing an abnormality detection output; and
    switching means for switching the detection sensitivity of said abnormality detection means, said switching means comprising means for switching the detection sensitivity to a higher level during recording of information than during reproducing of information.

2. An apparatus according to claim 1, wherein said abnormality detection means comprises first detection means for detecting the abnormality of said focusing servo means with a predetermined sensitivity and second detection means for detecting the abnormality of said focusing servo means with a sensitivity higher than the predetermined sensitivity of said first detection means, and said switching means further comprises means for respectively rendering said first and second detection means operative and inoperative during reproducing, and for respectively rendering said second and first detection means operative and inoperative during recording.

3. An apparatus according to claim 1, further comprising power varying means for varying the power of the light beam between periods during recording and during reproducing, said power varying means comprising transmitting means for transmitting an instruction signal to said recording-reproducing means in accordance with the power of the light beam, and wherein said switching means further comprises means for varying the sensitivity of said abnormality detection means in accordance with the instruction signal transmitted by said power varying means.

4. An apparatus according to claim 1, further comprising control means for controlling said recording-reproducing means, said control means comprising means for receiving the abnormality detection output and for suspending recording and reproducing when said abnormality detection means detects an abnormality.

5. An apparatus for effecting at least one of recording and reproducing of information by irradiating an optical recording medium with a light beam, said apparatus comprising:

a light source for emitting the light beam;

an objective lens for condensing the light beam emitted from said light source onto the recording medium to effect at least one of recording and reproducing of information;

an error signal detection circuit for receiving light from the recording medium to detect a focusing error of the light beam, and for outputting a focusing error signal;

an actuator for receiving the focusing error signal and for moving said objective lens parallel to an optical axis of said objective lens in accordance with the focusing error signal;

abnormality detection means for detecting an abnormality of the focusing error signal, said abnormality detection means comprising a detector for receiving light reflected from the optical recording medium, means for comparing with a reference signal a signal indicative of light quantity received by said detector which becomes greater near an in-focus point and lesser at points away from the in-focus point, and means for outputting an abnormality detection output if the signal indicative of the light quantity becomes less than the reference value; and a control circuit for controlling the recording and reproducing of information, said control circuit receiving the abnormality detection output and suspending at least one of recording and reproducing when said abnormality detection means detects an abnormality.

6. An apparatus for selectively effecting at least one of recording and reproducing of information by irradiating an optical recording medium with a light beam, said apparatus comprising:

a light source for emitting the light beam;

an objective lens for condensing the light beam emitted from said light source onto the recording medium to effect at least one of recording and reproducing of information;

an error signal detection circuit for receiving light from the recording medium to detect a focusing error of the light beam, and for outputting a focusing error signal;

an actuator for receiving the focusing error signal and for moving said objective lens parallel to an optical axis of said objective lens in accordance with the focusing error signal;

an abnormality detection circuit for receiving light from the recording medium to detect an abnormality of the focusing error signal by comparing the received light quantity with a reference value, said abnormality detection circuit having a predetermined sensitivity and producing an abnormality detection output; and a switching circuit for switching the detection sensitivity of said abnormality detection circuit, said switching circuit switching the detection sensitivity to a higher level during recording of information than during reproducing of information.

7. An apparatus according to claim 6, further comprising a power indication circuit for outputting an instruction signal for recording and reproducing and a laser driving circuit for varying the power of the light beam emitted from said light source in accordance with the instruction signal output by said power indication circuit, and wherein said switching circuit varies the sensitivity of said abnormality detection circuit in accordance with the instruction signal.

8. An apparatus for selectively effecting at least one of recording and reproducing of information by irradiating an optical recording medium with a light beam, said apparatus comprising:

a light source for emitting the light beam;

an objective lens for condensing the light beam emitted from said light source onto the recording medium for effecting at least one of recording and reproducing of information;

an error signal detection circuit for receiving light from the recording medium to detect a focusing error of the light beams and for outputting a focusing error signal;

an actuator for receiving the focusing error and for moving said objective lens parallel to an optical axis of said objective lens in accordance with the focusing error signal;

an abnormality detection circuit for receiving light from the recording medium to detect an abnormality of the focusing error signal by comparing received light quantity with a reference value; and a switching circuit for rendering said abnormality detection circuit operative during recording, and for rendering said abnormality detection circuit inoperative during reproducing.

9. An optical information processing apparatus comprising:

recording-reproducing means for effecting at least one of recording and reproducing of information by scanning an optical recording medium with a condensed light beam, said recording-reproducing means comprising scanning means for scanning the recording medium with the light beam;

focusing error detecting means for receiving light from the recording medium to detect a focusing error of the light beam, and for outputting a focusing error signal;

focusing servo means for receiving the focusing error signal and for controlling said scanning means to correct a focusing state of the light beam on the basis of the focusing error signal;

abnormality detection means for detecting an abnormality of said focusing servo means by comparing the level of the focusing error signal output from said focusing error detecting means with a reference value, and for outputting a detection output if the level of the error signal exceeds the reference value, said abnormality detection means having a predetermined detection sensitivity; and switching means for switching the detection sensitivity of said abnormality detection means, said switching means comprising means for switching the detection sensitivity to a higher level during recording of information than during reproducing of information.

10. An apparatus according to claim 9, wherein said abnormality detection means comprises first detection means for detecting the abnormality of said focusing servo means with a predetermined sensitivity and second detection means for detecting the abnormality of said focusing servo means with a sensitivity higher than the predetermined sensitivity of said first detection means, and said switching means further comprises means for respectively rendering said first and second detection means operative and inoperative during reproducing, and for respectively rendering said second and first detection means operative and inoperative during recording.

11. An apparatus according to claim 9, further comprising power varying means for varying the power of the light beam between periods during recording and during reproducing, said power varying means comprising transmitting means for transmitting an instruction signal to said recording-reproducing means in accordance with the power of the light beam, and wherein said switching means further comprises means for varying the sensitivity of said abnormality detection means in accordance with the instruction signal transmitted by said power varying means.

12. An apparatus according to claim 9, further comprising control means for controlling said recording-reproducing means, said control means comprising means for receiving the abnormality detection output and for suspending recording and reproducing when said abnormality detection means detects an abnormality.

13. An apparatus for selectively effecting at least one of recording and reproducing of information by irradiating an optical recording medium with a light beam, said apparatus comprising:
a light source for emitting the light beam;
an objective lens for condensing the light beam emitted from said light source onto the recording medium to effect at least one of recording and reproducing of information;
an error signal detection circuit for receiving light from the recording medium to detect a focusing error of the light beam, and for outputting a focusing error signal;
an actuator for receiving the focusing error signal and for moving said objective lens parallel to an optical axis of said objective lens in accordance with the focusing error signal;
an abnormality detection circuit for detecting an abnormality of said focusing error signal output from said focusing error detecting means with a reference value, and for outputting a detection output if the level of the error signal exceeds the reference value, said abnormality detection circuit having a predetermined detection sensitivity; and
a switching circuit for switching the detection sensitivity of said abnormality detection circuit, said switching circuit comprising means for switching the detection sensitivity to a higher level during recording of information than during reproducing of information.

14. An apparatus according to claim 13, wherein said abnormality detection circuit comprises a first comparing circuit for comparing the level of the focusing error signal with a first reference value and a second comparing circuit for comparing the level of the focusing error signal with a second reference value, which is lower than the first reference value, and said switching circuit comprises a switch for inputting the focusing error signal into said first comparing circuit during reproducing, and for inputting the focusing error signal into said second comparing circuit during recording.

15. An apparatus according to claim 13, further comprising a power indication circuit for outputting an instruction signal for recording and reproducing and a laser driving circuit for varying the power of the light beam emitted from said light source in accordance with the instruction signal output by said power indication circuit, and wherein said switching circuit varies the sensitivity of said abnormality detection circuit in accordance with the instruction signal.

16. An apparatus for selectively effecting at least one of recording and reproducing of information by irradiating an optical recording medium with a light beam, said apparatus comprising:
a light source for emitting the light beam;
an objective lens for condensing the light beam emitted from said light source onto the recording medium to effect at least one of recording and reproducing of information;
an error signal detection circuit for receiving light from the recording medium to detect a focusing error of the light beam, and for outputting a focusing error signal;
an actuator for receiving the focusing error signal and for moving said objective lens parallel to an optical axis of said objective lens in accordance with the focusing error signal;
an abnormality detection circuit for detecting an abnormality of said focusing servo means by comparing the level of the focusing error signal output from said focusing error detecting means with a reference value, and for outputting a detection output if the level of the error signal exceeds the reference value, said abnormality detection circuit having a predetermined detection sensitivity; and
a switching circuit for rendering said abnormality detection circuit operative during recording, and for rendering said abnormality detection circuit inoperative during reproducing.

17. An apparatus according to claim 16, further comprising control means for controlling said recording and reproducing means, said control means comprising means for receiving the abnormality detection output and for suspending recording and reproducing when said abnormality detection circuit detects an abnormality.

* * * * *

UNITED STATES PATENT AND TRADEMARK OFFICE
CERTIFICATE OF CORRECTION

PATENT NO. : 5,361,246
DATED : November 1, 1994
INVENTOR(S) : Hidekazu TOMINAGA

It is certified that error appears in the above-indentified patent and that said Letters Patent is hereby corrected as shown below:

IN THE DRAWINGS:

In Fig. 1, "FOCUSSING" should read --FOCUSING--;
In Fig. 2, in logic blocks 8, 9 and 22, "FOCUSSING" should read --FOCUSING--.
In Fig. 3, in logic blocks 8 and 9, "FOCUSSING" should read --FOCUSING--.
In Fig. 6, "FOCUSSING" (all three occurrences) should read --FOCUSING--.
In Fig. 7, "FOCUSSING" (both occurrences) should read --FOCUSING--.

COLUMN 1:

Line 20, "for and" should read --and for--;
Line 32, " "AF")." should read --"AT").--; and
Line 37, "(autofocusing" should read --(auto-focusing,--.

COLUMN 2:

Line 1, "De" should read --be--.

UNITED STATES PATENT AND TRADEMARK OFFICE
CERTIFICATE OF CORRECTION

PATENT NO. : 5,361,246
DATED : November 1, 1994
INVENTOR(S) : Hidekazu TOMINAGA

It is certified that error appears in the above-indentified patent and that said Letters Patent is hereby corrected as shown below:

COLUMN 3:

Line 2, "perpendicular" should read --perpendicularly--;
Line 12, "curie" should read --Curie--;
Line 18, "curie" should read --Curie--; and
Line 23, "the" (second occurrence) should read --a--.

COLUMN 5:

Line 33, "extends" should read --extended--.

COLUMN 6:

Line 5, "shade" should read --shape--;
Line 15, "beam said" should read --beam, said--; and
Line 27, "receiving" should read --receiving light--.

COLUMN 8:

Line 19, "beams and" should read --beam, and--.

Signed and Sealed this

Twentieth Day of June, 1995

Attest:

BRUCE LEHMAN

*Attesting Officer*           *Commissioner of Patents and Trademarks*